(12) United States Patent
Nakao et al.

(10) Patent No.: US 12,531,277 B2
(45) Date of Patent: Jan. 20, 2026

(54) LEAD-ACID BATTERY

(71) Applicant: GS Yuasa International Ltd., Kyoto (JP)

(72) Inventors: Koichiro Nakao, Kyoto (JP); Toshio Kitami, Kyoto (JP); Masahiro Yamasaki, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 591 days.

(21) Appl. No.: 17/788,345

(22) PCT Filed: Nov. 5, 2020

(86) PCT No.: PCT/JP2020/041305
§ 371 (c)(1),
(2) Date: Jun. 23, 2022

(87) PCT Pub. No.: WO2021/131338
PCT Pub. Date: Jul. 1, 2021

(65) Prior Publication Data
US 2023/0031873 A1 Feb. 2, 2023

(30) Foreign Application Priority Data
Dec. 25, 2019 (JP) .................... 2019-233703

(51) Int. Cl.
*H01M 10/16* (2006.01)
*H01M 4/14* (2006.01)
*H01M 50/114* (2021.01)

(52) U.S. Cl.
CPC ............. *H01M 10/16* (2013.01); *H01M 4/14* (2013.01); *H01M 50/114* (2021.01)

(58) Field of Classification Search
CPC ..................................................... H01M 10/16
See application file for complete search history.

(56) References Cited

FOREIGN PATENT DOCUMENTS

| CN | 109088072 A | * | 12/2018 | ............ H01M 4/362 |
| CN | 109301100 A | * | 2/2019 | |

(Continued)

OTHER PUBLICATIONS

International Search Report (ISR) dated Jan. 12, 2021 filed in PCT/JP2020/041305.

*Primary Examiner* — Matthew T Martin
*Assistant Examiner* — Krishna R Hammond
(74) *Attorney, Agent, or Firm* — RANKIN, HILL & CLARK LLP

(57) ABSTRACT

A lead-acid battery includes: a housing that includes a container including one open end and a lid closing the opening of the container; and an element that includes a plurality of positive electrode plates and a plurality of negative electrode plates alternately arranged in the container with a separator interposed therebetween. Each positive electrode plate includes a first foot protruding toward a bottom face of the container, and each negative electrode plate includes a second foot protruding toward the bottom face of the container. The first foot and the second foot are disposed at positions different from each other when viewed from the arrangement direction of the elements. A rib, which extends from an end of a specific region sandwiched between a row including a plurality of the first feet protruding from the element and a row including a plurality of the second feet protruding from the element and divides at least a part of the specific region into a plurality of regions, is formed on the bottom face of the container when viewed from a direction perpendicular to the bottom face.

5 Claims, 5 Drawing Sheets

(56) References Cited

FOREIGN PATENT DOCUMENTS

| | | | |
|---|---|---|---|
| JP | S57140079 U | | 2/1981 |
| JP | 58-186557 U | | 12/1983 |
| JP | 60-166972 U | | 11/1985 |
| JP | 62-271369 A | | 11/1987 |
| JP | S62271369 A | * | 11/1987 |
| JP | 2003-297414 A | | 10/2003 |
| JP | 2003-346738 A | | 12/2003 |
| JP | 2012079609 A | | 4/2012 |

* cited by examiner

LEAD-ACID BATTERY

TECHNICAL FIELD

The technique disclosed in the present specification relates to a lead-acid battery.

BACKGROUND ART

For example, the lead-acid battery is used as a backup power source of a communication base station. The lead-acid battery includes a housing and an element housed in the housing. The housing includes a container having one open end and a lid that seals the opening of the container. The element includes a plurality of positive electrode plates and a plurality of negative electrode plates alternately arranged with separators interposed therebetween in the container. Each positive electrode plate includes a first foot protruding toward a bottom face of the container, and each negative electrode plate includes a second foot protruding toward the bottom face of the container. The first foot and the second foot are disposed at positions different from each other when viewed from the arrangement direction of the elements.

In the conventional lead-acid battery, a plurality of ribs (referred to as "saddles") extending in the above arrangement direction are formed on the bottom face of the container, the first foot protruding from the plurality of positive electrode plates is disposed on one rib, and the second foot protruding from the plurality of negative electrode plates is disposed on the other rib (see, for example, Patent Document 1). In such the configuration, because a space is formed between the bottom face of the container and the element by the rib, for example, the expanded element is prevented from directly hitting the bottom face of the container.

PRIOR ART DOCUMENT

Patent Document

Patent Document 1: JP-A-2003-297414

SUMMARY OF THE INVENTION

Problems to be Solved by the Invention

Some lead-acid batteries are charged in a longitudinally placed state in which the element in the housing is horizontally arranged, and after the charge, the element in the housing is used in a transversely placed state in which the element in the housing are vertically arranged. In the lead-acid battery used in the transversely placed state, for example, there is a possibility that the positive electrode plate and the negative electrode plate are short-circuited due to an active material dropped from a plate during charge. Specifically, when the lead-acid battery is in the longitudinally placed state, sometimes the dropped active material falls between the plates and accumulates on the bottom face of the container. Thereafter, when the lead-acid battery is in the transversely placed state, the active material accumulated on the bottom face of the container is collected at one place on one side (lower side) in the arrangement direction of the electrode groups along the rib. As a result, the first foot of the positive electrode plate and the second foot of the negative electrode plate are electrically connected to each other through the active material collected at the one place, and a short circuit is generated.

The present specification discloses a technique capable of preventing the short circuit between the positive electrode plate and the negative electrode plate due to the dropped active material.

Means for Solving the Problems

A lead-acid battery disclosed in the present specification includes: a housing that includes a container including one open end and a lid closing the opening of the container; and an element that includes a plurality of positive electrode plates and a plurality of negative electrode plates alternately arranged in the container with a separator interposed therebetween. Each positive electrode plate includes a first foot protruding toward a bottom face of the container, and each negative electrode plate includes a second foot protruding toward the bottom face of the container. The first foot and the second foot are disposed at different positions when viewed from an arrangement direction of the elements in which the element is arranged. A rib, which extends from an end of a specific region sandwiched between a row including a plurality of the first feet protruding from the element and a row including a plurality of the second feet protruding from the element and divides at least a part of the specific region into a plurality of regions, is formed on the bottom face of the container when viewed from a direction perpendicular to the bottom face.

MODE FOR CARRYING OUT THE INVENTION

Figure 1:
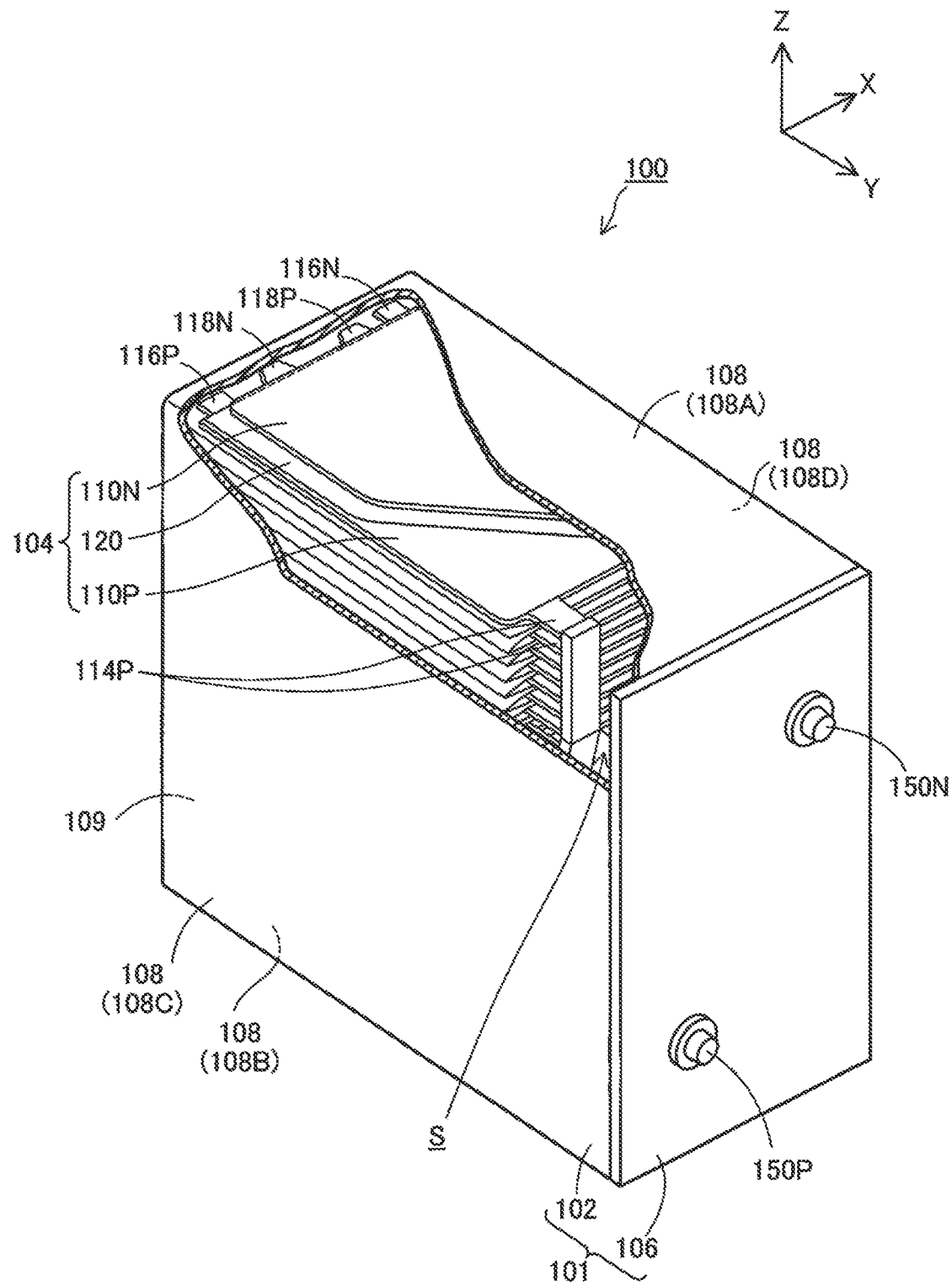
FIG. 1 is a perspective view illustrating an external configuration (transversely placed state) of a lead-acid battery 100 according to a first embodiment.

The technology disclosed in the present specification can be implemented as the following forms.

(1) A lead-acid battery disclosed in the present specification is a lead-acid battery including: a housing that includes a container including one open end and a lid closing the opening of the container; and an element that includes a plurality of positive electrode plates and a plurality of negative electrode plates alternately arranged in the container with a separator interposed therebetween. Each of the positive electrode plates includes a first foot protruding toward a bottom face of the container, and each of the negative electrode plates includes a second foot protruding toward the bottom face of the container, the first foot and the second foot are disposed at different positions when viewed from an arrangement direction of the elements in which the element is arranged, and a rib, which extends from an end of a specific region sandwiched between a row including a plurality of the first feet protruding from the element and a row including a plurality of the second feet protruding from the element and divides at least a part of the specific region into a plurality of regions, is formed on the bottom face of the container when viewed from a direction perpendicular to the bottom face.

In the lead-acid battery, the rib is formed on the bottom face. The rib is formed so as to divide at least a part of the specific region, which is sandwiched between a row including a plurality of the first feet protruding from the element and a row including a plurality of the second feet protruding from the element when viewed from the direction perpendicular to the bottom face of the container. Thus, when the lead-acid battery is changed from the longitudinally placed state to the transversely placed state, the active material accumulated on the bottom face of the container is dispersed in a plurality of regions divided by the rib. Thus, according to the lead-acid battery, as compared with the conventional configuration not including the rib, when the lead-acid battery is changed from the longitudinally placed state to the transversely placed state, the active material accumulated on the bottom face of the container can be prevent from being gathered at one place to short-circuit the first foot of the positive electrode plate and the second foot of the negative electrode plate. This short circuit preventing effect is larger than that of a flooded-type lead-acid battery because the active material accumulated on the bottom face of the container is hardly stirred in a valve regulated lead-acid battery not having a flowable electrolyte solution.

(2) In the lead-acid battery, the rib may include a first rib that divides the specific region into a plurality of regions in the arrangement direction of the element. According to the present lead-acid battery, when the lead-acid battery is changed from the longitudinally placed state to the transversely placed state, the active material accumulated on the bottom face of the container is vertically dispersed in a plurality of regions divided by the first rib. As a result, according to the lead-acid battery, the active material deposited on the bottom face of the container can be prevented from being gathered at one place to short-circuit the first foot of the positive electrode plate and the second foot of the negative electrode plate.

(3) In the lead-acid battery, the first rib may be separated from at least one of a pair of side walls of the container, the pair of side walls being substantially parallel to the arrangement direction of the element. According to the lead-acid battery, as compared with the configuration in which the first rib is in contact with both of the pair of side walls, because the difference in rigidity between the peripheral wall of the container and the bottom is small, the container can be prevented from being damaged due to concentration of stress on the boundary between the peripheral wall of the container and the bottom, for example, when the lead-acid battery is deformed due to expansion or contraction.

(4) In the lead-acid battery, the rib may include a second rib that divides the specific region into a plurality of regions a direction substantially perpendicular to the arrangement direction of the element. According to the present lead-acid battery, when the lead-acid battery is changed from the longitudinally placed state to the transversely placed state, the active material accumulated on the bottom face of the container is horizontally dispersed in a plurality of regions divided by the second rib. As a result, according to the lead-acid battery, the active material deposited on the bottom face of the container can be prevented from being gathered at one place to short-circuit the first foot of the positive electrode plate and the second foot of the negative electrode plate.

(5) In the lead-acid battery, the second rib may extend from one side wall of a pair of side walls substantially perpendicular to the arrangement direction of the element in the container and is separated from the other side wall. According to the lead-acid battery, as compared with the configuration in which the second rib is in contact with both of the pair of side walls, because the difference in rigidity between the peripheral wall of the container and the bottom is small, the container can be prevented from being damaged due to concentration of stress on the boundary between the peripheral wall of the container and the bottom, for example, when the lead-acid battery is deformed due to expansion or contraction.

(6) In the lead-acid battery, the rib may include a third rib that further divides one region divided by the second rib in the specific region into a plurality of regions in the arrangement direction of the element, and a fourth rib that further divides the other region divided by the second rib into a plurality of regions in the arrangement direction of the element, and a position of a coupling portion between the second rib and the third rib and a position of a coupling portion between the second rib and the fourth rib may be different from each other in the arrangement direction of the element. According to the lead-acid battery when the lead-acid battery is changed from the longitudinally placed state to the transversely placed state, the active material accumulated on the bottom face of the container is dispersed in a plurality of regions divided to the left and right by the second rib, and is further dispersed in a plurality of regions divided to the upper and lower sides by the third rib and the fourth rib. In addition, as compared with the configuration in which the position of the coupling portion between the second rib and the third rib and the position of the coupling portion between the second rib and the fourth rib are the same as each other in the arrangement direction of the elements, the active material accumulated on the bottom face of the container can be more effectively prevented from being gathered at one place to short-circuit the first foot of the positive electrode plate and the second foot of the negative electrode plate.

A. First Embodiment

A-1. Entire Configuration (Configuration of Lead-Acid Battery 100)

FIG. 1 is a perspective view illustrating an external configuration of a lead-acid battery 100 according to a first embodiment. In FIG. 1, the lead-acid battery 100 is disposed in a horizontal state. In FIG. 1, for convenience, a part of a later-described housing 101 included in the lead-acid battery 100 is broken to illustrate an internal structure. In FIG. 1, XYZ-axes mutually orthogonal to one another are illustrated in order to specify the directions. In the present specification, for the sake of convenience, a Z-axis positive direction is referred to as an "upward direction" and a Z-axis negative direction is referred to as a "downward direction", but the lead-acid battery 100 may be actually installed in a posture different from such the direction. The same applies to FIG. 2 and the subsequent drawings. Hereinafter, "P" is added to an end of the reference numeral of the component on a positive electrode side, and "N" is added to the end of the reference numeral of the component on a negative electrode side.

For example, the lead-acid battery 100 in the first embodiment is disposed in the longitudinal placed state during charge in a manufacturing stage, and is used in the transversely placed state (see FIG. 1) after the charge. For example, a plurality of lead-acid batteries 100 are arranged in a predetermined frame, and used as a backup power supply of the communication base station. The longitudinally placed state is a posture in which the housing 101 (container 102) is disposed in a direction in which an element 104 described later is arranged in a horizontal direction (a direction orthogonal to the Z-axis direction), and the transversely placed state is a posture in which the housing 101 is disposed in a direction in which the element 104 is arranged in a vertical direction (the Z-axis direction) (see FIG. 1).

As illustrated in FIG. 1, the lead-acid battery 100 includes the housing 101 and the element 104. The housing 101 includes a container 102 and a lid 106. The container 102 is a substantially rectangular parallelepiped case having one open end, and for example, is formed of a synthetic resin. Specifically, the container 102 includes a peripheral wall having a square tubular shape that is formed of four side walls 108 (108A to 108D) and a bottom 109 that closes one end of the peripheral wall. In the transverse placed state of FIG. 1, the first side wall 108A and the second side wall 108B are opposite to each other in the vertical direction (Z-axis direction), and the third side wall 108C and the fourth side wall 108D are opposite to each other in the horizontal direction (X-axis direction). An electrolyte solution (not illustrated) and the element 104 are housed in an internal space S of the housing 101. For example, the electrolyte solution is dilute sulfuric acid.

(Configuration of Element 104)

The element 104 includes a plurality of tabular positive electrode plates 110P, a plurality of tabular negative electrode plates 110N, and a plurality of separators 120 disposed between the positive electrode plates 110P and the negative electrode plates 110N. Specifically, the plurality of positive electrode plates 110P and the plurality of negative electrode plates 110N are alternately arranged one by one with the separator 120 interposed therebetween. Thus, a plurality of cells each of which includes one positive electrode plate 110P and one negative electrode plate 110N that are opposite to each other with the separator 120 interposed therebetween are arranged in a predetermined direction (in the transversely placed state of FIG. 1, the Z-axis direction). Hereinafter, the arrangement direction of the cells is referred to as a "cell array direction". The cell array direction is an example of the arrangement direction of the element in the claims.

Each of the plates 110P, 110N is a conductive member in which a grid is filled with the active material. An ear 114P protruding upward is provided on one end side (the X-axis negative direction side in FIG. 1) in the upper portion of each positive electrode plate 110P. The plurality of positive electrode plates 110P are connected to each other by a current collecting member (not illustrated) on the positive electrode side through each ear 114P. The ear (not illustrated) protruding upward are not provided on the other end side (the X-axis positive direction side in FIG. 1) in the upper portion of each negative electrode plate 110N. The plurality of negative electrode plates 110N are connected to each other by a current collecting member (not illustrated) on the negative electrode side through each lug.

Each positive electrode plate 110P includes a pair of first feet 116P, 118P protruding toward the bottom face (bottom 109) of the container 102. Each negative electrode plate 110N includes a pair of second feet 116N, 118N protruding toward the bottom face (bottom 109) of the container 102. The pair of first feet 116P, 118P and the pair of second feet 116N, 118N are disposed at different positions when viewed from the cell array direction. Specifically, the pair of first feet 116P, 118P and the pair of second feet 116N, 118N are alternately arranged in the horizontal direction (X-axis direction). More specifically, the first foot 116P is located substantially immediately below the ear 114P in the positive electrode plate 110P, and the second foot 116N is located substantially immediately below the ear in the negative electrode plate 110N. The first foot 118P is disposed at a position closer to the second foot 116N, and the second foot 118N is disposed at a position closer to the first foot 116P.

(Configuration of Lid 106)

The lid 106 is a substantially rectangular member, has a size corresponding to the opening of the container 102, and for example, is formed of a synthetic resin. The lid 106 is fitted into the opening of the container 102, and for example, the lid 106 and the container 102 are thermally welded, whereby the internal space S of the housing 101 is closed.

A terminal 150P on the positive electrode side and a terminal 150N on the negative electrode side are provided in the lid 106. The terminal 150P on the positive electrode side and the terminal 150N on the negative electrode side are disposed on a diagonal line of the lid 106 (see FIG. 1). The terminal 150P on the positive electrode side is electrically connected to the plurality of positive electrode plates 110P through the current collecting member on the positive electrode side. The terminal 150N on the negative electrode side is electrically connected to the plurality of negative electrode plates 110N through the current collecting member on the negative electrode side.

A-2. Bottom Configuration of Container 102

Figure 2:
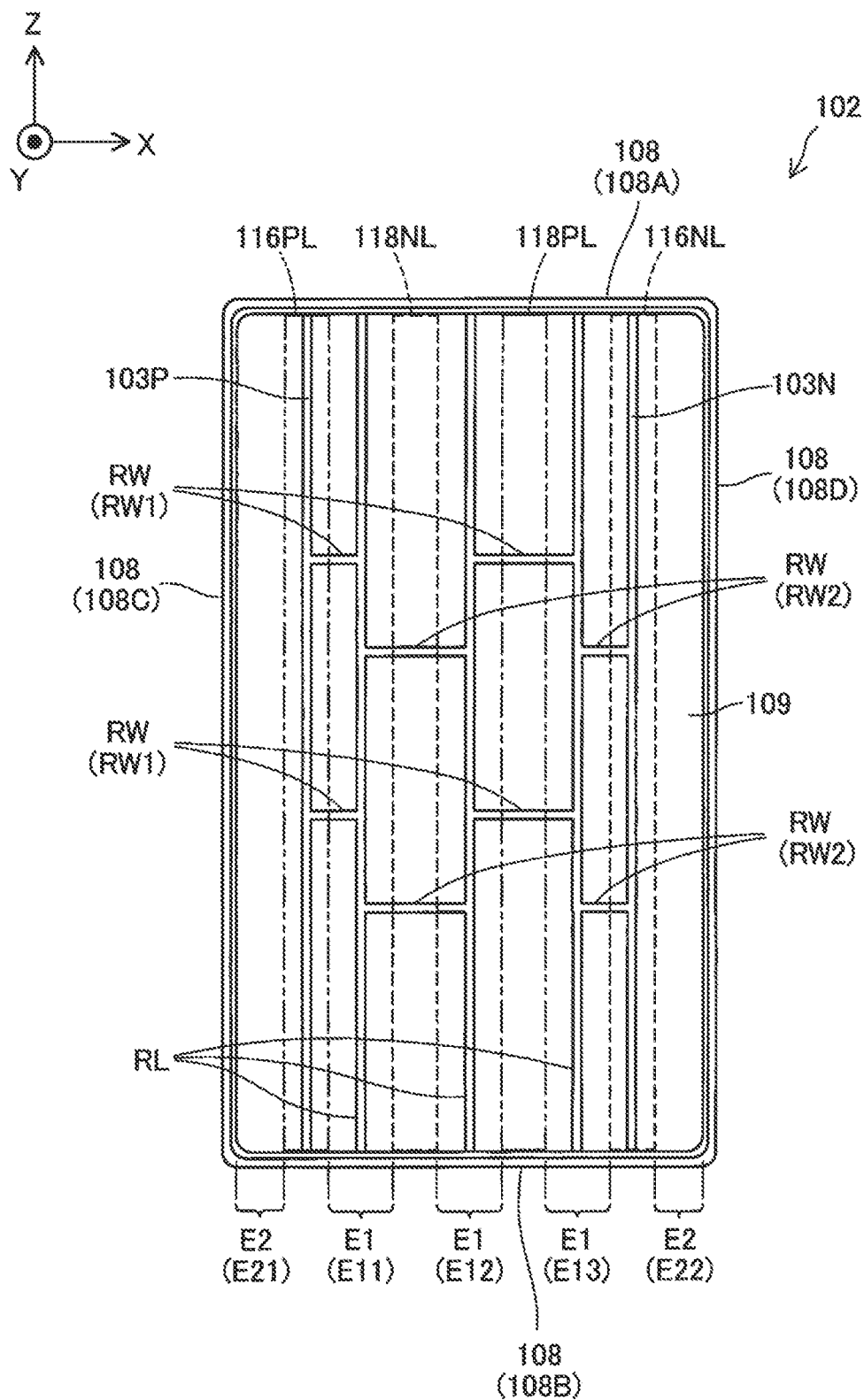
FIG. 2 is an explanatory view illustrating a bottom face configuration of a container 102 of the lead-acid battery 100 in the first embodiment.

FIG. 2 is an explanatory view illustrating a bottom face configuration of the container 102 of the lead-acid battery 100 in the first embodiment. FIG. 2 illustrates a configuration of an inner wall surface (bottom face) of the bottom 109 when the lead-acid battery 100 is viewed from a direction (in FIG. 2, a Y-axis direction, hereinafter referred to as a "bottom face direction") perpendicular to the bottom face of the container 102. In FIG. 2, the lid 106 and the element 104 are omitted, and first foot array regions 116PL, 118PL and second foot array regions 116NL, 118NL are illustrated. The meaning of each array region is as follows.

"First foot array region 116PL": this is a region where a row including a plurality of first feet 116P protruding from the element 104 (the plurality of positive electrode plates 110P) is disposed when the lead-acid battery 100 is viewed from the bottom face direction.

"First foot array region 118PL": this is a region where a row including a plurality of first feet 118P protruding from the element 104 (the plurality of positive electrode plates 110P) is disposed when the lead-acid battery 100 is viewed from the bottom face direction.

"Second foot arrangement region 116NL": this is a region where a row including a plurality of second feet 116N protruding from the element 104 (the plurality of negative electrode plates 110N) is disposed when the lead-acid battery 100 is viewed from the bottom face direction.

"Second foot arrangement region 118NL": this is a region where a row including a plurality of second feet 118N protruding from the element 104 (the plurality of negative electrode plates 110N) is disposed when the lead-acid battery 100 is viewed from the bottom face direction.

As illustrated in FIG. 2, a plurality of (two in the first embodiment) support ribs 103P, 103N supporting the respective feet are formed on the bottom face of the container 102. The support rib 103P on the positive electrode side is a convex portion (saddle) linearly extending along the cell array direction (Z-axis direction) in the first foot array region 116PL on the bottom face of the container 102. A plurality of first feet 116P are disposed so as to be opposite to the support rib 103P on the positive electrode side. The support rib 103P on the positive electrode side extends over the entire length of the bottom face of the container 102 in the cell array direction. The support rib 103N on the negative electrode side is a convex portion (saddle) linearly extending along the cell array direction in the second foot array region 116NL in the bottom face of the container 102. A plurality of second feet 116N are disposed so as to be opposite to the support rib 103N on the negative electrode side. The support rib 103N on the negative electrode side extends over the entire length of the bottom face of the container 102 in the cell array direction. These support ribs 103P, 103N form a space between each of the plates 110P, 110N and the bottom face of the container 102.

As illustrated in FIG. 2, on the bottom face of the container 102, ribs (a longitudinal rib RL, a transverse rib RW) are formed which divide an intermediate region E1 sandwiched between the first foot array regions 116PL, 118PL and the second foot array regions 116NL, 118NL into a plurality of regions when viewed from the bottom face direction. The intermediate region E1 is an example of a specific region in the claims. Hereinafter, a specific description will be given.

A plurality of longitudinal ribs RL are formed on the bottom face of the container 102, and each longitudinal rib RL divides each intermediate region E1 into a plurality of regions in the horizontal direction (X-axis direction in FIG. 2). Each longitudinal rib RL is a convex portion linearly extending along the cell array direction in each intermediate region E1 on the bottom face of the container 102. Each longitudinal rib RL extends over the entire length of the bottom face of the container 102 in the cell array direction. The longitudinal rib RL is an example of the second rib in the claims.

For example, when viewed from the bottom face direction, one longitudinal rib RL is formed between the first foot array region 116PL and the second foot array region 118NL, and the longitudinal rib RL divides a first intermediate region E11 into two regions arranged in the direction substantially perpendicular to the cell array direction. When viewed from the bottom face direction, one longitudinal rib RL is formed between the second foot array region 118NL and the first foot array region 118PL, and the longitudinal rib RL divides a second intermediate region E12 into two regions arranged in the direction substantially perpendicular to the cell array direction. When viewed from the bottom face direction, one longitudinal rib RL is formed between the first foot array region 118PL and the second foot array region 116NL, and the longitudinal rib RL divides a third intermediate region E13 into two regions arranged in the direction substantially perpendicular to the cell array direction.

A plurality of first transverse ribs RW1 and a plurality of second transverse ribs RW2 are formed on the bottom face of the container 102. When viewed from the bottom face direction, each of the first transverse ribs RW1 further divides one of the intermediate regions E1 divided by the longitudinal rib RL into a plurality of regions in the cell array direction (Z-axis direction). Each of the first transverse ribs RW1 is a convex portion extending linearly along the horizontal direction (X-axis direction). When viewed from the bottom face direction, each of the second transverse ribs RW2 further divides the other region divided by the longitudinal rib RL in each intermediate region E1 into a plurality of regions in the cell array direction. Each of the second transverse ribs RW2 is a convex portion extending linearly along the direction perpendicular to the cell array direction. The position of the coupling portion between the first transverse rib RW1 and the longitudinal rib RL and the position of the coupling portion between the second transverse rib RW2 and the longitudinal rib RL are different from each other in the cell array direction. The first transverse rib RW1 is an example of the third rib in the claims, and the second transverse rib RW2 is an example of the fourth rib in the claims.

For example, one region (the region on the negative X-axis direction side in FIG. 2) of the first intermediate region E11 divided by the longitudinal rib RL is divided into three regions arranged in the cell array direction by the two first transverse ribs RW1 arranged in the cell array direction (Z-axis direction). The other region (the region on the positive X-axis direction side in FIG. 2) of the first intermediate region E11 divided by the longitudinal rib RL is divided into three regions arranged in the cell array direction by the two second transverse ribs RW2 arranged in the cell array direction. The positions of the two first transverse ribs RW1 and the positions of the two second transverse ribs RW2 are different from each other in the cell array direction. Both ends of each first transverse rib RW1 are coupled to both the support rib 103P and the longitudinal rib RL adjacent to the support rib 103P. Each second transverse rib RW2 is coupled to both of the pair of longitudinal ribs RL adjacent to each other. The third intermediate region E13 is similar to the first intermediate region E11.

For example, one region (the region on the positive X-axis direction side in FIG. 2) of the second intermediate region E12 divided by the longitudinal rib RL is divided into three regions arranged in the cell array direction by the two first transverse ribs RW1 arranged in the cell array direction. The other region (the region on the negative X-axis direction side in FIG. 2) of the second intermediate region E12 divided by the longitudinal rib RL is divided into three regions arranged in the cell array direction by the two second transverse ribs RW2 arranged in the cell array direction. The positions of the two first transverse ribs RW1 and the positions of the two second transverse ribs RW2 are different from each other in the cell array direction. Both ends of each first transverse rib RW1 are coupled to both of the pair of longitudinal ribs RL adjacent to each other, and both ends of each second transverse rib RW2 are coupled to both of the pair of longitudinal ribs RL adjacent to each other.

The transverse rib RW (the first transverse rib RW1 and the second transverse rib RW2) is separated from both of a pair of side walls (the third side wall 108C, the fourth side wall 108D) substantially parallel to the cell array direction (Z-axis direction) in the container 102. Specifically, as illustrated in FIG. 2, the rib is not formed in a first end region E21 sandwiched between the first foot array region 116PL and the third side wall 108C. The rib is not formed in a second end region E22 sandwiched between the second foot array region 116NL and the fourth side wall 108D.

A-3. Effect of First Embodiment

Figure 3:
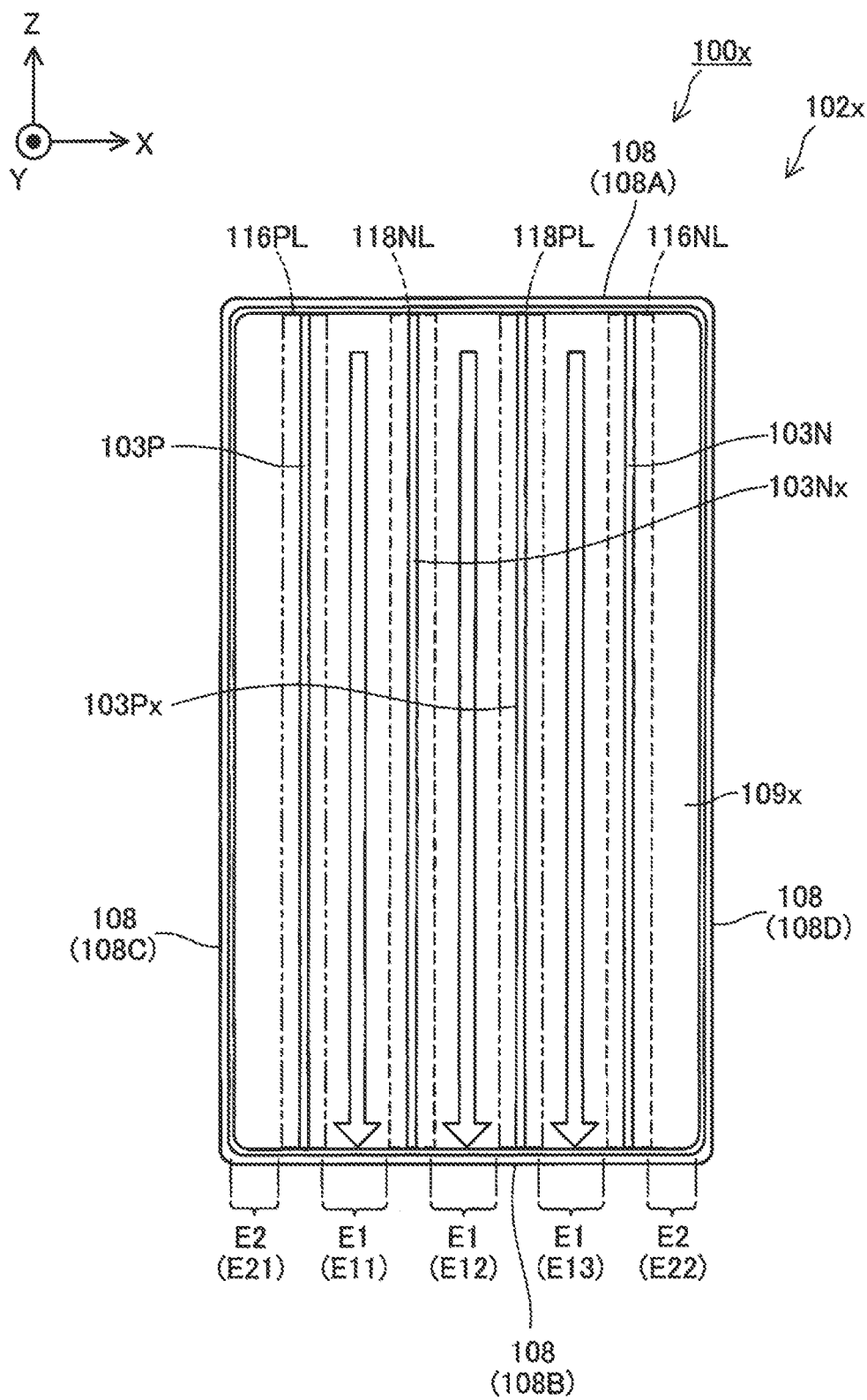
FIG. 3 is an explanatory view illustrating a bottom face configuration of a container 102x of a lead-acid battery 100x according to a comparative example.

FIG. 3 is an explanatory view illustrating a bottom configuration of a container 102x of a lead-acid battery 100x according to a comparative example. FIG. 3 illustrates the configuration of the inner wall surface (bottom face) of a bottom 109x when the lead-acid battery 100x is viewed from the bottom face direction. In FIG. 3, similarly to FIG. 2, the lid 106 and the element 104 are omitted, and the first foot array regions 116PL, 118PL and the second foot array regions 116NL, 118NL are illustrated.

As illustrated in FIG. 3, the lead-acid battery 100x of the comparative example is different from the lead-acid battery 100 of the first embodiment in that the support rib is formed on the bottom face of the container 102x, but neither the longitudinal rib nor the transverse rib is formed. That is, in the comparative example, a support rib 103Px on the positive electrode side and a support rib 103Nx on the negative electrode side are formed in addition to the support rib 103P on the positive electrode side and the support rib 103N on the negative electrode side. The support rib 103Px on the positive electrode side is a convex portion linearly extending along the cell array direction (Z-axis direction) in the first foot array region 118PL on the bottom face of the container 102. The support rib 103Nx on the negative electrode side is a convex portion linearly extending along the cell array direction in the second foot array region 118NL in the bottom face of the container 102. The rib dividing the intermediate region E1 is not formed in each intermediate region E1.

At this point, in the lead-acid battery 100x of the comparative example, in the longitudinal placed state, the active material included in the element 104 is accumulated on the bottom face of the container 102x. Thereafter, when the lead-acid battery 100x is in the transversely placed state, as illustrated by an arrow in FIG. 3, the active material accumulated on the bottom face of the container 102x is collected at one place on one side (the Z-axis negative direction side in FIG. 3) in the cell array direction along the support rib 103P and the like. As a result, the first feet 116P, 118P of the positive electrode plate 110P and the second feet 116N, 118N of the negative electrode plate 110N are electrically connected to each other through the active material collected at one place, and the short circuit is generated. For example, all the active materials accumulated in the first intermediate region E11 is collected on the lower end side of the first intermediate region E11. As a result, the collected active material comes into contact with both the first foot 116P and the second foot 118N, so that the positive electrode plate 110P and the negative electrode plate 110N are short-circuited.

On the other hand, in the lead-acid battery 100 of the first embodiment, the longitudinal ribs RL and the transverse ribs RW (hereinafter, referred to as the "longitudinal rib RL and the like") are formed on the bottom face of the container 102. The longitudinal rib RL and the like are formed so as to divide each intermediate region E1 when viewed from the bottom face direction. As a result, when the lead-acid battery 100 is changed from the longitudinally placed state to the transversely placed state, the active material accumulated on the bottom face of the container 102 is dispersed in a plurality of regions divided by the longitudinal ribs RL and the like. Thus, according to the first embodiment, as compared with the comparative example not including the longitudinal ribs RL and the like, when the lead-acid battery 100 is changed from the longitudinally placed state to the transversely placed state, the active material accumulated on the bottom face of the container 102 can be prevented from being gathered at one place to short-circuit the positive electrode plate 110P and the negative electrode plate 110N.

Specifically, in the first embodiment, the plurality of longitudinal ribs RL are formed on the bottom face of the container 102. For this reason, when the lead-acid battery 100 is changed from the longitudinally placed state to the transversely placed state, the active material accumulated on the bottom face of the container 102 is dispersed in the plurality of regions divided in the horizontal direction (X-axis direction in FIG. 2) by the longitudinal rib RL. Thus, according to the first embodiment, the active material accumulated on the bottom face of the container 102 can be prevented from being gathered at one place to short-circuit the positive electrode plate 110P and the negative electrode plate 110N.

In the first embodiment, the transverse rib RW is further formed on the bottom face of the container 102. For this reason, when the lead-acid battery 100 is changed from the longitudinally placed state to the transversely placed state, the active material accumulated on the bottom face of the container 102 is dispersed in the plurality of regions divided to the left and right by the longitudinal rib RL, and is further dispersed in the plurality of regions divided to the upper and lower sides (Z-axis direction in FIG. 2) by the transverse rib RW (first transverse rib RW1, second transverse rib RW2). Thus, the active material accumulated on the bottom face of the container 102 can be more effectively prevented from being gathered at one place to short-circuit the positive electrode plate 110P and the negative electrode plate 110N.

At this point, for example, in the configuration in which the position of the coupling portion between the first transverse rib RW1 and the longitudinal rib RL and the position of the coupling portion between the second transverse rib RW2 and the longitudinal rib RL are the same in the cell array direction, the active material is gathered at one place by the first transverse rib RW1 and the second transverse rib RW2, so that there is a risk that the positive electrode plate 110P and the negative electrode plate 110N are short-circuited. On the other hand, in the first embodiment, the position of the coupling portion between the first transverse rib RW1 and the longitudinal rib RL and the position of the coupling portion between the second transverse rib RW2 and the longitudinal rib RL are different from each other in the cell array direction. For this reason, for example, as compared with the configuration in which the position of the coupling portion between the first transverse rib RW1 and the longitudinal rib RL and the position of the coupling portion between the second transverse rib RW2 and the longitudinal rib RL are the same in the cell array direction, the active material accumulated on the bottom face of the container 102 can be more effectively prevented from being gathered at one place to short-circuit the positive electrode plate 110P and the negative electrode plate 110N.

In the first embodiment, the transverse rib RW (the first transverse rib RW1 or the second transverse rib RW2) is separated from both of the pair of side walls (the third side wall 108C, the fourth side wall 108D) substantially parallel to the cell array direction (Z-axis direction) in the container 102. For this reason, as compared with the configuration in which the transverse rib RW is in contact with both of the pair of side walls, because the difference in rigidity between the peripheral wall of the container 102 and the bottom 109 is small, the container 102 can be prevented from being damaged due to concentration of stress on the boundary between the peripheral wall of the container 102 and the bottom 109, for example, when the lead-acid battery 100 is deformed due to expansion, contraction, or the like. In the end region E2, even when the active material is gathered at one place, the positive electrode plate 110P and the negative electrode plate 110N are not short-circuited, so that the transverse rib RW is not required to be formed.

As in the first embodiment, in the configuration in which the longitudinal rib RL is formed on the bottom face of the container 102 in addition to the support ribs 103P, 103N, the rigidity of the bottom 109 in the container 102 increases, and the rigidity difference between the bottom 109 and the peripheral wall in the container 102 increases. In this case, when the lead-acid battery 100 is deformed due to the expansion, the contraction, or the like, the stress is concentrated on, for example, a corner of the container 102, and the container 102 is easily damaged. On the other hand, in the first embodiment, the support rib that supports a part (the first foot 118P, the second foot 118N) of the foot projecting from the element 104 is not formed on the bottom face of the container 102. Thus, the container 102 can be prevented from being damaged due to the rigidity difference between the bottom 109 and the peripheral wall of the container 102 as compared with the configuration in which all the support ribs supporting the foot protruding from the element 104 are formed.

B. Second Embodiment

Figure 4:
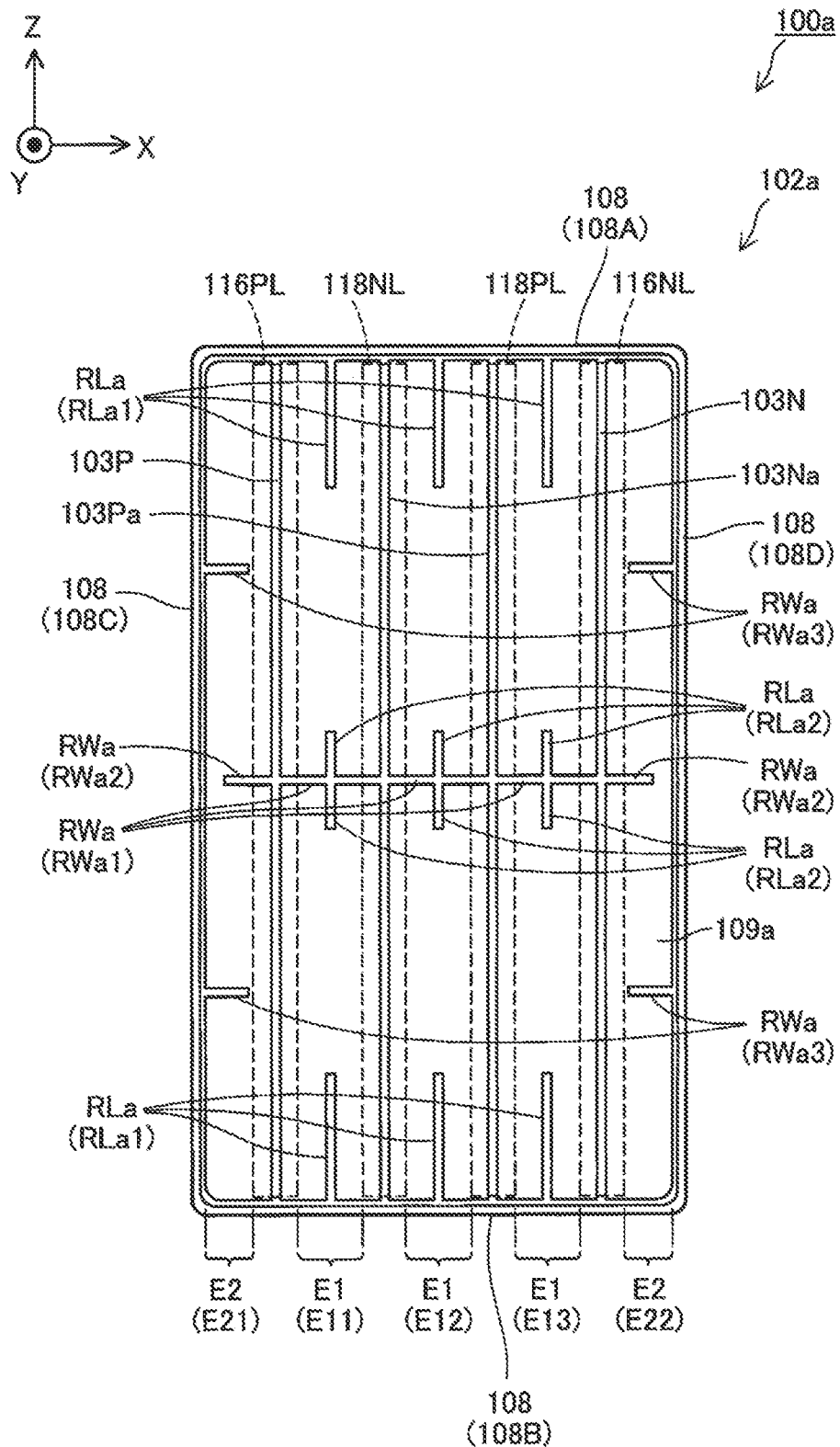
FIG. 4 is an explanatory view illustrating a bottom face configuration of a container 102a of a lead-acid battery 100a according to a second embodiment.

FIG. 4 is an explanatory view illustrating a bottom configuration of a container 102a of a lead-acid battery 100a according to a second embodiment. FIG. 4 illustrates the configuration of the inner wall surface (bottom face) of a bottom 109a when the lead-acid battery 100a is viewed from the bottom face direction. Hereinafter, in the configurations of the lead-acid battery 100a of the second embodiment, the same configurations as those of the lead-acid battery 100 of the first embodiment described above are denoted by the same reference numerals, and the description thereof will be appropriately omitted.

As illustrated in FIG. 4, on the bottom face of the container 102a, a support rib 103Pa on the positive electrode side and a support rib 103Na on the negative electrode side are formed in addition to the support rib 103P on the positive electrode side and the support rib 103N on the negative electrode side in the first embodiment. The support rib 103Pa on the positive electrode side is a convex portion linearly extending along the cell array direction (Z-axis direction) in the first foot array region 118PL on the bottom face of the container 102a. The support rib 103Na on the negative electrode side is a convex portion linearly extending along the cell array direction in the second foot array region 118NL in the bottom face of the container 102a. As described above, in the second embodiment, the support ribs 103P, 103Pa, 103N, 103Na supporting the feet are disposed for all of the plurality of feet 116P, 118P, 116N, 118N protruding from the element 104. For this reason, as compared with the configuration in which the support ribs are disposed only on a part of the plurality of feet protruding from the element 104, the container 102a can be more reliably prevented from being damaged by the feet when the lead-acid battery 100 is deformed due to the expansion, the contraction, or the like.

As illustrated in FIG. 4, a transverse rib RWa (a first transverse rib RWa1, a second transverse rib RWa2, a third transverse rib RWa3) is formed on the bottom face of the container 102a.

Each of the first transverse ribs RWa1 divides the entire intermediate region E1 into a plurality of regions in the cell array direction (Z-axis direction). Each of the first transverse ribs RWa1 is a convex portion extending linearly along the horizontal direction (X-axis direction). Each first transverse rib RWa1 is located at the center of each intermediate region E1 in the cell array direction, and equally divides each intermediate region E1 into two. Both ends of each first transverse rib RWa1 are in contact with two support ribs adjacent to each other. For this reason, the active material accumulated in one of the two regions divided by the first transverse rib RWa1 in each intermediate region E1 is prevented from moving to the other region. Thus, the active material accumulated on the bottom face of the container 102a can be more effectively prevented from being gathered at one place to short-circuit the positive electrode plate 110P and the negative electrode plate 110N.

Each second transverse rib RWa2 divides a part of each end region E2 into a plurality of regions in the cell array direction (Z-axis direction). Each second transverse rib RWa2 is a convex portion extending linearly along the horizontal direction (X-axis direction). One end of the second transverse rib RWa2 is in contact with the rib (support ribs 103P, 103N) located at an end in the horizontal direction, and the other end of the second transverse rib RWa2 is separated from the side wall 108 (108C, 108D) of the container 102a.

Each third transverse rib RWa3 divides a part of each end region E2 into a plurality of regions in the cell array direction. Each third transverse rib RWa3 is a convex portion extending linearly along the horizontal direction. One end of the third transverse rib RWa3 is in contact with the side wall 108 of the container 102a, and the other end of the second transverse rib RWa2 is separated from the rib (support ribs 103P, 103N) located at an end in the horizontal direction.

The second transverse rib RWa2 and the third transverse rib RWa3 are disposed at different positions in the cell array direction. A part of the second transverse rib RWa2 and a part of the third transverse rib RWa3 overlap each other when viewed from the cell array direction. Thus, for example, as compared with the configuration in which the transverse rib is in contact with both the side wall 108 of the container 102a and the rib located at the end in the horizontal direction, when the lead-acid battery 100a is deformed due to the expansion or the contraction, the container 102a can be prevented from being damaged due to the concentration of the stress on the boundary between the side wall 108 of the container 102a and the bottom 109a. In addition, the active material accumulated on the bottom face of the container 102a can be prevented from being gathered at one place to short-circuit the first foot of the positive electrode plate and the second foot of the negative electrode plate.

As illustrated in FIG. 4, a longitudinal rib RLa (a first longitudinal rib RLa1, a second longitudinal rib RLa2) is formed on the bottom face of the container 102a. At this point, the longitudinal rib RL of the first embodiment has the configuration in which the entire intermediate region E1 is divided into a plurality of regions. That is, one end of each longitudinal rib RL is in contact with the first side wall 108A of the container 102, and the other end of each longitudinal rib RL is in contact with the second side wall 108B (see FIG. 2). On the other hand, the longitudinal rib RLa of the second embodiment has a configuration in which a part of each intermediate region E1 is divided into a plurality of regions.

Each first longitudinal rib RLa1 divides a part of each region divided by the first transverse rib RWa1 in each intermediate region E1 into a plurality of regions in the horizontal direction (X-axis direction). Each first longitudinal rib RLa1 is a convex portion extending linearly along the cell array direction (Z-axis direction). One end of the first longitudinal rib RLa1 is in contact with the side wall 108 (108A, 108B) of the container 102a, and the other end of the second transverse rib RWa2 is separated from the first transverse rib RWa1.

Each second longitudinal rib RLa2 divides a part of each region divided by the first transverse rib RWa1 in each intermediate region E1 into a plurality of regions in the horizontal direction (X-axis direction). Each second longitudinal rib RLa2 is a convex portion extending linearly along the cell array direction (Z-axis direction). One end of the second longitudinal rib RLa2 is in contact with the first transverse rib RWa1, and the other end of the second transverse rib RWa2 is separated from the side wall 108 (108A, 108B) of the container 102a.

The first longitudinal rib RLa1 and the second longitudinal rib RLa2 are separated from each other in the cell array direction (Z-axis direction). With such the configuration, for example, when the lead-acid battery 100a is disposed in the transverse placed state where the second side wall 108B is located downward (see FIG. 4), the active material accumulated in each intermediate region E1 is dispersed in two in the cell array direction by the first transverse rib RWa1. Furthermore, the active material accumulated in the region above the first transverse rib RWa1 is dispersed in two by the second longitudinal rib RLa2, and the active material accumulated in the region below the first transverse rib RWa1 is dispersed in two by the first longitudinal rib RLa1. As described above, according to the second embodiment, the active material accumulated in each intermediate region E1 can be dispersed in four places. In the lead-acid battery 100a, the configuration of the ribs at the bottom 109a is symmetrical in the cell array direction, so that the active material accumulated in each intermediate region E1 can be similarly dispersed at four places even when the first side wall 108A is disposed in the horizontal placement state in which the first side wall is located downward.

Furthermore, as described above, in the second embodiment, the support ribs are arranged for all of the plurality of feet protruding from the element 104, so that the rigidity of the bottom 109a of the container 102a is increased accordingly. On the other hand, one end of the longitudinal rib RLa is separated from the side wall 108 of the container 102a, and an increase in rigidity of the bottom 109a due to the longitudinal rib RLa is prevented. Thus, the short circuit between the positive electrode plate and the negative electrode plate due to the active material accumulated on the bottom face of the container 102a can be prevented while the damage of the container 102a due to the foot is prevented.

C. Third Embodiment

Figure 5:
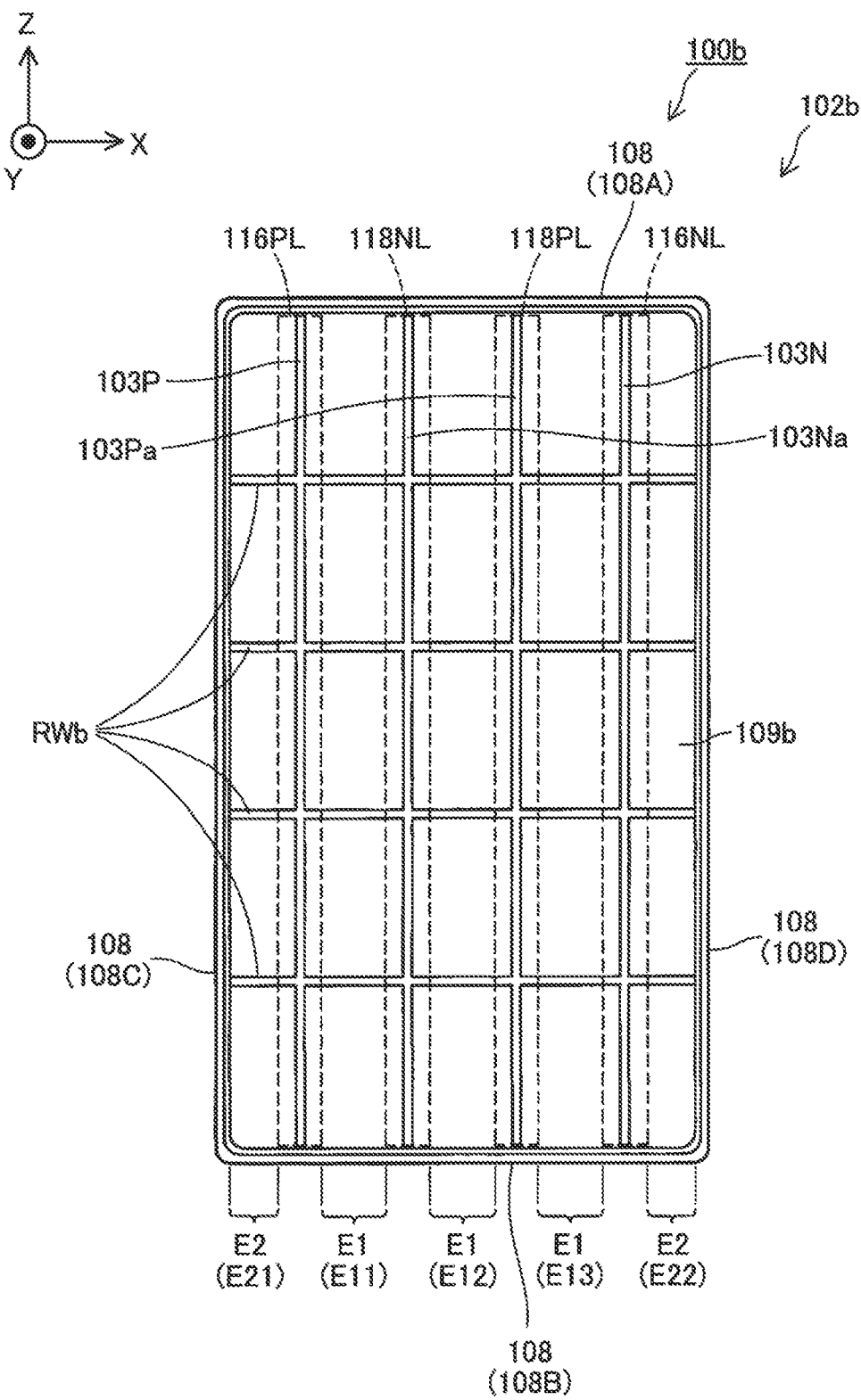
FIG. 5 is an explanatory view illustrating a bottom face configuration of a container 102b of a lead-acid battery 100b according to a third embodiment.

FIG. 5 is an explanatory view illustrating a bottom configuration of a container 102b of a lead-acid battery 100b according to a third embodiment. FIG. 5 illustrates the configuration of the inner wall surface (bottom face) of a bottom 109b when the lead-acid battery 100b is viewed from the bottom face direction. Hereinafter, in the configurations of the lead-acid battery 100b of the third embodiment, the same configurations as those of the lead-acid battery 100 of the first embodiment described above are denoted by the same reference numerals, and the description thereof will be appropriately omitted.

As illustrated in FIG. 5, on the bottom face of the container 102b, a support rib 103Pa on the positive electrode side and a support rib 103Na on the negative electrode side are formed in addition to the support rib 103P on the positive electrode side and the support rib 103N on the negative electrode side in the first embodiment. Because each of the support ribs 103Pa, 103Na is the same as that of the second embodiment, the description thereof will be omitted.

As illustrated in FIG. 5, a transverse rib RWb is formed on the bottom face of the container 102b. Each transverse rib RWb divides the entirety of each intermediate region E1 and each end region E2 into a plurality of regions in the cell array direction (Z-axis direction). Specifically, four transverse ribs RWb are arranged at equal intervals in the cell array direction, and each of the regions E1, E2 is divided into five. The transverse rib RWb is a convex portion extending linearly along the horizontal direction (X-axis direction). The transverse rib RWb is in contact with the pair of side walls 108C, 108D of the container 102b. In the third embodiment, the longitudinal rib is not formed.

D. Modification

The technique disclosed in the present specification is not limited to the above-described embodiments, but can be modified into various forms without departing from the gist thereof, and for example, the following modifications are also possible.

The configuration of the lead-acid battery 100 in the above embodiment is merely an example, and various modifications can be made. For example, the housing 101 may have a configuration in which the internal space S is partitioned into a plurality of cell chambers, and the electrolyte solution and the element 104 are accommodated in each cell chamber. In the above embodiment, the conductive member in which the grid is filled with the active material is exemplified as the positive electrode and the negative electrode. However, for example, the positive electrode may have a form in which a plurality of braided tubes are arrayed.

In the above embodiment, each of the plates 110P. 110N has the configuration having the pair of feet. However, each of the plates 110P, 110N may have a configuration having one foot or a configuration having at least three feet. The number of feet included in the positive electrode plate 110P and the number of feet included in the negative electrode plate 110N may be different from each other.

In the above embodiment, the two support ribs 103P, 103N are formed on the bottom face of the container 102. However, a configuration in which the support rib supporting the foot of the plate is not formed on the bottom face of the container 102 or a configuration in which at least three support ribs are formed may be adopted. At least one end of the support ribs 103P, 103N may be separated from the peripheral wall of the container 102.

In the above embodiment, the longitudinal rib RL has the shape extending linearly along the cell array direction. However, for example, the longitudinal rib RL may have a shape extending in a direction inclined obliquely with respect to the cell array direction, or may have a non-linear shape including a curved portion and a bent portion. For example, a plurality of longitudinal ribs RL may be formed in one intermediate region E1.

In the above embodiment, the transverse rib RW has the shape extending linearly along the direction perpendicular to the cell array direction. However, for example, the transverse rib RW may have a shape extending in a direction inclined obliquely with respect to the perpendicular direction, or may have a non-linear shape including a curved portion and a bent portion. In the above embodiment, one transverse rib RW may be formed in one region divided by the longitudinal rib RL, or at least three transverse ribs RW may be formed.

In the above embodiment, the transverse rib RW (RW1, RW2) may not be formed on the bottom face of the container 102. Even in the configuration including only the longitudinal rib RL, the active material accumulated on the bottom face of the container 102 is dispersed in a plurality of regions divided by the longitudinal rib RL, so that the short circuit between the positive electrode plate 110P and the negative electrode plate 110N due to the active material accumulated on the bottom face of the container 102 can be prevented. In the above embodiment, only the transverse rib that divides each intermediate region E1 into a plurality of regions in the cell array direction may be formed on the bottom face of the container 102. Even in the configuration including only the transverse rib, the active material accumulated on the bottom face of the container 102 is dispersed in a plurality of regions divided by the transverse rib, so that the short circuit between the positive electrode plate 110P and the negative electrode plate 110N due to the active material accumulated on the bottom face of the container 102 can be prevented. The transverse rib is an example of the first rib in the claims.

In the above embodiment, the transverse rib RW may be in contact with at least one of the pair of side walls (the third side wall 108C, the fourth side wall 108D). In the above embodiment, the transverse rib or the longitudinal rib may be formed in the end region E2. However, at least one end of the transverse rib or the longitudinal rib is preferably separated from the peripheral wall of the container 102. With such the configuration, the stress can be prevented from concentrating on the corner of the container 102 due to the increase in the rigidity difference between the bottom and the peripheral wall of the container 102 by the existence of the rib to easily damage the container 102. At least one of the ribs (RW, RL, 103P, 103N) may be formed separately from the container 102.

The material forming each component of the lead-acid battery 100 in the above embodiment is merely an example, and various modifications are possible.

DESCRIPTION OF REFERENCE SIGNS 100, 100a, 100b, 100x: lead-acid battery
101: housing
102, 102a, 102b, 102x: container
103N, 103Na, 103Nx, 103P, 103Pa, 103Px: support rib
104: element
106: lid
108A: first side wall
108B: second side wall
108C: third side wall
108D: fourth side wall
109, 109a, 109b, 109x: bottom
110N: negative electrode plate
110P: positive electrode plate
114P: ear
116N, 118N: second foot
116NL, 118NL: second foot array region
116P, 118P: first foot
116PL, 118PL: first foot array region
120: separator
150N: terminal
150P: terminal
E11: first intermediate region
E12: second intermediate region
E13: third intermediate region
E21: first end region
E22: second end region
RL (RLa1, RLa2): longitudinal rib
RW (RW1, RW2, RWa1, RWa2, RWa3, RWb): transverse rib
S: internal space

The invention claimed is:

1. A lead-acid battery comprising:
a housing that includes a container including one open end and a bottom face opposite to the open end in a first direction, and a lid closing the open end of the container; and
an element that includes a plurality of positive electrode plates and a plurality of negative electrode plates alternately arranged in the container in a second direction perpendicular to the first direction with a separator interposed between each of the plurality of positive electrode plates and a corresponding one of the plurality of negative electrode plates,
wherein
each of the positive electrode plates includes a first foot protruding toward the bottom face of the container, and each of the negative electrode plates includes a second foot protruding toward the bottom face of the container,
the first foot and the second foot are disposed at different positions when viewed from the second direction,
the bottom face includes a rib, which extends from the bottom face in the first direction,
a top end of the rib in the first direction is below a lowermost end of the element in the first direction, the lowermost end being opposite to the open end of the container,
when viewed from the first direction, the rib extends in a specific region sandwiched between a row extending in the second direction and including a plurality of the first feet protruding from the element and a row extending in the second direction and including a plurality of the second feet protruding from the element, and divides at least a part of the specific region into a plurality of regions,
and
the rib includes a first rib that divides the specific region into a plurality of regions in the second direction.

2. The lead-acid battery according to claim 1, wherein the first rib is spaced apart from at least one of a pair of side walls of the container, the pair of side walls being substantially parallel to the second direction.

3. The lead-acid battery according to claim 1, wherein the rib further includes a second rib that divides the specific region into a plurality of regions in a third direction substantially perpendicular to the first direction and the second direction.

4. The lead-acid battery according to claim 3, wherein the second rib extends from one side wall of a pair of side walls substantially perpendicular to the second direction and is spaced apart from the other side wall.

5. The lead-acid battery according to claim 3, wherein
the first rib includes a third rib that further divides one region divided by the second rib in the specific region into a plurality of regions in the second direction, and a fourth rib that further divides the other region divided by the second rib into a plurality of regions in the second direction, and
a position of a coupling portion between the second rib and the third rib and a position of a coupling portion between the second rib and the fourth rib are different from each other in the second direction.

\* \* \* \* \*